(12) United States Patent
Hatta

(10) Patent No.: US 9,256,260 B2
(45) Date of Patent: Feb. 9, 2016

(54) PROCESSING SYSTEM, PROCESSING DEVICE AND POWER SUPPLY CONTROL METHOD

(75) Inventor: Yoshiaki Hatta, Yokkaichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 483 days.

(21) Appl. No.: 13/808,007

(22) PCT Filed: Aug. 3, 2011

(86) PCT No.: PCT/JP2011/067726
§ 371 (c)(1),
(2), (4) Date: Jan. 2, 2013

(87) PCT Pub. No.: WO2012/018033
PCT Pub. Date: Feb. 9, 2012

(65) Prior Publication Data
US 2013/0103959 A1 Apr. 25, 2013

(30) Foreign Application Priority Data
Aug. 5, 2010 (JP) ................................. 2010-176634

(51) Int. Cl.
*G06F 1/26* (2006.01)
*H04L 12/12* (2006.01)
*H04L 12/40* (2006.01)
*G06F 1/32* (2006.01)

(52) U.S. Cl.
CPC ............... *G06F 1/26* (2013.01); *G06F 1/3209* (2013.01); *G06F 1/3287* (2013.01); *H04L 12/12* (2013.01);
(Continued)

(58) Field of Classification Search
CPC ....... G06F 1/26; G06F 1/3209; G06F 1/3287; H04L 12/12; H04L 12/40039; Y02B 60/1282; Y02B 60/34
See application file for complete search history.

(56) References Cited

U.S. PATENT DOCUMENTS 6,862,508 B2 * 3/2005 Akiyama et al. ................ 701/48
8,428,154 B2 * 4/2013 Ishiko ........................... 375/257
(Continued)

FOREIGN PATENT DOCUMENTS

| JP | A-2006-180205 | 7/2006 |
| JP | A-2008-193606 | 8/2008 |
| JP | A-2008-290538 | 12/2008 |

OTHER PUBLICATIONS

Sep. 13, 2011 International Search Report issued in International Application No. PCT/JP2011/067726.

Primary Examiner — M Elamin
(74) Attorney, Agent, or Firm — Oliff PLC

(57) ABSTRACT

A microcomputer of an ECU which is a master determines whether to turn on or off the power supply of a slave ECU, and outputs a power supply control signal indicating power-on/off via serial communication on the basis of the result of determination. A signal superposition circuit accepts the output power supply control signal and transmits the accepted power supply control signal to a CAN bus to which a CAN transceiver is connected. In the slave ECU, a signal separation circuit individually receives a CAN communication signal and a serial communication signal transmitted to the CAN bus, while an input/output control circuit to which the serial communication signal is input as the power supply control signal outputs a signal to the power supply circuit to control power-on/off of the microcomputer.

10 Claims, 7 Drawing Sheets

(52) U.S. Cl.
CPC . *H04L 12/40039* (2013.01); *H04L 2012/40215* (2013.01); *Y02B 60/1282* (2013.01); *Y02B 60/34* (2013.01)

(56) References Cited

U.S. PATENT DOCUMENTS

| | | | |
|---|---|---|---|
| 8,874,298 B2* | 10/2014 | Houchin-Miller et al. | 701/22 |
| 2004/0083043 A1* | 4/2004 | Akiyama et al. | 701/48 |
| 2004/0207263 A1* | 10/2004 | Yanagida et al. | 307/10.1 |
| 2004/0223275 A1* | 11/2004 | Yanagida et al. | 361/62 |
| 2005/0049722 A1* | 3/2005 | Kobayashi | 700/9 |
| 2006/0224278 A1* | 10/2006 | Yanagida et al. | 701/1 |
| 2010/0070106 A1* | 3/2010 | Okamoto et al. | 701/1 |
| 2010/0211676 A1* | 8/2010 | Takada et al. | 709/224 |
| 2011/0064126 A1* | 3/2011 | Ishiko | 375/222 |
| 2014/0108545 A1* | 4/2014 | Natsume | 709/204 |

* cited by examiner

PROCESSING SYSTEM, PROCESSING DEVICE AND POWER SUPPLY CONTROL METHOD

This application is the national phase under 35 U.S.C. §371 of PCT International Application No. PCT/JP2011/067726 which has an International filing date of Aug. 3, 2011 and designated the United States of America.

FIELD

The present invention relates to power supply control of a system in which a plurality of processing devices communicate with one another, and more specifically to a processing system, a processing device and a power supply control method that can individually control the power supply of the processing devices connected to one communication medium, and thus can reduce power consumption in the entire system.

BACKGROUND

Such a system that includes a plurality of processing devices connected with one another through a communication medium to exchange information and to realize various types of signal processing has been used in a number of fields.

Especially in the field of vehicles, the control of a vehicle has been undergoing transition from mechanical control to electrical control. Hence, such a system in which a large number of vehicle-mounted processing devices, i.e. ECUs (Electronic Control Units) are mounted and respectively connected to vehicle-mounted communication lines in order to transmit and receive data for control to realize various functions becomes widely used.

In the field of vehicles, while a large number of ECUs are mounted as described above, it is desired to reduce power consumption for the entire vehicle. It is thus required to reduce power consumption of the entire system including ECUs, while a number of techniques for individually reducing power consumption of each ECU have been proposed.

In a structure in which existing in-vehicle ECUs are connected by bus connection to a communication line, the ECUs connected to the same communication line are basically activated all at once. When switching to a power-saving state, all the ECUs that are connected to the same communication line are ready to be switched to the power-saving state. Each of the ECUs is switched to the power-saving state only after communication on the communication line is stopped. Naturally, when a communication signal is sent out from any one of the ECUs to the same communication line, all the ECUs connected thereto sense the input of the communication signal and are activated. However, depending on circumstances, some ECUs may be unnecessary to be activated among the ECUs connected to the same communication line. Even in such a case, when all the ECUs connected to the same communication line are simultaneously activated and switched to the power-saving state, power saving as the entire system is insufficient. In order to reduce power consumption, it is desired to allow each of the ECUs connected to the same communication line to individually be activated or switched to the power-saving state.

A technique, therefore, has been devised in that information regarding activation or switching to the power-saving state of an ECU is separately transmitted and received between ECUs so that each ECU can individually be activated or switched to the power-saving state on the basis of the information. For example, the ECUs are connected through a dedicated signal line so as to separately transmit and receive signals different from an existing communication protocol (e.g., CAN (Controller Area Network)), to mutually control activation or switching to the power-saving state. This, however, incurs a waste such that a dedicated signal line is required in the system. Especially in the field of vehicles, reduction in weight of a vehicle is encouraged for improved fuel consumption. Increase of an excess signal line should thus be avoided.

Japanese Patent Application Laid-Open No. 2008-193606 discloses a system and a method for superposing the second signal on a twist pair cable in the same phase between ECUs communicating with each other according to the CAN protocol using a differential signal, making it possible to transmit data different from a communication signal in CAN.

Moreover, Japanese Patent Application Laid-Open No. 2008-290538 discloses a system for superposing a different modulation signal to communication according to the CAN protocol, to increase an amount of information that can be transmitted and received without the need for an extra communication line.

SUMMARY

Japanese Patent Application Laid-Open No. 2008-193606, however, only discloses a configuration in which high-frequency signals are superposed, since it is directed to communication of information having data amount larger than that in the CAN communication, such as a video signal for example. It is thus not considered at all for the configuration in which ECUs transmit information for power supply control between each other.

In the method disclosed in Japanese Patent Application Laid-Open No. 2008-290538, the modulation signal is transmitted at the same timing as the data field of the CAN message. It is thus difficult to transmit and receive a modulation signal independently from the signal of CAN.

The present invention has been devised in view of the above circumstances, and its object is to provide a processing system, a processing device and a power supply control method that can individually perform power supply control of the processing device connected to one same communication medium while maintaining an existing form of communication without the need for connection through a special dedicated line.

A processing system according to the first aspect of the invention includes a plurality of processing devices connected via a communication line, each of the processing devices including: a processing part performing signal processing on an input signal and outputting the signal; a communication part connected to a communication line including two signal lines, receiving a signal transmitted using a differential signal on the basis of the first communication system to the communication line, outputting the received signal to the processing part and transmitting on the basis of the first communication system, the signal output from the processing part to the communication line; and a power supply control part controlling on/off of power supply from an outside to the processing part, and is characterized in that, in one processing device among the plurality of processing devices, the processing part outputs a control signal for controlling power-on/off to another processing device, and the above-described one processing device includes a transmission part transmitting on the basis of a second communication system, the control signal output by the processing part and directed to the above-described another processing device in the same phase to signal lines of the communication line, wherein in the another processing device, a reception part is provided for receiving a first signal based on the first communication system and a second signal based on the second communication system from the communication line, the first signal received by the reception part is input to the communication part and the second signal is input to the power supply control part, and the power supply control part controls on/off of the power supply on the basis of the input signal.

In the processing system according to the second aspect of the invention, the above-described another processing device further includes an input/output part to which the first signal received by the reception part, input to the communication part and output from the communication part to the processing part, and the second signal received by the reception part are input, and outputting the signals respectively to the power supply control part and the processing part on the basis of the input signal. The input/output part includes determination means for determining whether or not the input second signal is a control signal indicating power-off, and means for cutting off communication between the communication part and the processing part in a case where the determination means determines that the second signal is the control signal indicating power-off.

In the processing system according the third aspect of the invention, the input/output part turns on the power supply at the power supply control part and cancels cutting-off of communication between the communication part and the processing part in a case where the determination means determines that the second signal is a control signal indicating power-on.

In the processing system according to the fourth aspect of the invention, the control signal includes destination information for identifying a processing device to be controlled for power-on/off, the input/output part further includes means for determining whether or not the input second signal is directed to the above-described another processing device, and when the means for determining determines as not, the input/output part ignores the input second signal.

In the processing system according to the fifth aspect of the invention, the control signal includes information indicating power-on/off for each of a plurality of other processing devices.

In the processing system according to the sixth aspect of the invention, a communication speed in the second communication system is lower than a communication speed in the first communication system.

In the processing system according to the seventh aspect of the invention, in the first communication system a differential signal is used, and in the second communication system serial communication is executed.

A processing device according to the eighth aspect of the invention includes: a processing part performing signal processing on an input signal and outputting the signal; and a communication part connected to a communication line including two signal lines, receiving a signal transmitted using a differential signal on the basis of a first communication system to the communication line, outputting the received signal to the processing part, and transmitting on the basis of the first communication system, a signal output from the processing part to the communication line, and is characterized in that the processing part outputs a control signal for controlling power-on/off to another processing device. The processing device includes a transmission part transmitting on the basis of a second communication system, the control signal output from the processing part and directed to another processing device, to signal lines of the communication line in a same phase.

A processing device according to the ninth aspect of the invention includes: a processing part performing signal processing on an input signal and outputting the signal; a communication part connected to a communication line including two signal lines, receiving a signal transmitted using a differential signal on the basis of a first communication system to the communication line, outputting the received signal to the processing part, and transmitting on the basis of the first communication system, the signal output from the processing part to the communication line; and a power supply control part controlling on/off of power supply from an outside to the processing part, and is characterized by including a reception part receiving a first signal based on the first communication system and a second signal based on a second communication system from the communication line, the first signal received by the reception part is input to the communication part and the second signal received by the reception part is input to the power supply control part, and the power supply control part controls on/off of the power supply on the basis of an input signal.

A power supply control method according to the tenth aspect of the invention for controlling power consumption of a plurality of processing devices in a processing system in which the plurality of the processing devices are connected via a communication line, each of the processing devices including: a processing part performing signal processing on an input signal and outputting the signal; a communication part connected to a communication line including two signal lines, receiving a signal transmitted using a differential signal on the basis of a first communication system to the communication line, outputting the received signal to the processing part, and transmitting on the basis of the first communication system, the signal output from the processing part to the communication line; and a power supply control part controlling on/off of power supply from an outside to the processing part, is characterized in that, in one processing device among the plurality of processing devices, the processing part outputs a control signal for controlling power-on/off to another processing device, and the control signal output by the processing part and directed to the another processing device is transmitted to signal lines of the communication line in a same phase on the basis of a second communication system. In another processing device, a first signal based on the first communication system and a second signal based on the second communication system are received from the communication line, the received first signal is received by the communication part, the received second signal is input to the power supply control part, and the power supply control part controls on/off of power supply on the basis of an input control signal.

In the present invention, one processing device among the plurality of processing devices transmits a control signal for controlling power-on/off of another processing device to the signal lines of the communication line, on which a differential signal based on the first communication system is transmitted and received, in the same phase on the basis of the second communication system. On the communication line connecting the plurality of processing devices with each other, a signal based on the first communication system and a signal based on the second communication system are superposed. It is possible to prevent one signal from interfering with the other signal, since one is a differential signal whereas the other is an in-phase signal. The another processing device for which on/off of the power supply is to be controlled receives a signal based on the first communication system and a signal based on the second communication system. The signal based on the first communication system is received at the conventional communication part while the signal based on the second communication system is input to the power supply control part, which controls on/off of the power supply to the processing part on the basis of a control signal output from the one processing device. The processing device in which the power supply to the processing part is turned off ignores a signal input from the communication part. This allows the plurality of processing devices connected to the same communication line to be turned off individually.

In the present invention, another processing device to be controlled for its on/off of the power supply receives the first signal based on the first communication system and the second signal based on the second communication system from the same communication line and includes an input/output part input a signal after input of the first signal to the communication part and the second signal to determine for the two signals in an integrated manner. In a case where the second signal is a control signal indicating power-off, the input/output part turns off power supply to the processing part and also cuts off communication between the communication part and the processing part. This prevents the communication part from inputting any signal based on the first communication system sent out onto the communication line from other processing device, and thus the processing part from activating, so that the another processing device can independently maintain the power supply to be off.

In the present invention, another processing device which turned off the power supply to the processing part in response to the reception of the control signal indicating power-off, and which cut off the communication between the communication part and the processing part can, upon receiving the control signal indicating power-on, turn on the power supply to the processing part while canceling the cut-off, allowing signals to be input/output between the communication part and the processing part. This also enables another processing device to independently return to the power-on state from the power-off state.

In the present invention, the control signal for power-on/off transmitted from one processing device to another processing device includes destination information that can identify which one of a plurality of other processing devices is to be controlled. This enables another processing device to determine whether or not the control signal transmitted onto the communication line on the basis of the second communication system is directed to itself, and enables one processing device to individually control power-on/off of another processing device. Note that the destination information is identification information such as an identification number for a processing device.

In the present invention, the control signal transmitted at a time includes information for power-on/off which is directed to a plurality of processing devices. Accordingly, one transmission of control signal can control power-on/off of the plurality of the processing devices, thereby improving the efficiency. It is noted that the control signal may be configured to be divided into a plurality of units in advance, and to include the information on power-on/off for each unit in a predetermined order of the processing devices. In a case where the control signal is digital, for example, the power-on/off for each processing device may be indicated bit by bit in the increasing order of identification numbers, i.e., the smallest number being first, so that one byte can control the power-on/off for eight processing devices.

In the present invention, the communication speed in the second communication system is lower than the communication speed in the first communication system. This can distinguish signals from one another, avoiding mutual interferences. Since the information on power-on/off can have a smaller amount of information compared to the information to be a target for signal processing performed by the processing part, no problem arises with a low communication speed.

In the present invention, in the first communication system a differential signal such as CAN is used, while in the second communication system serial communication is executed. Thus, the communication part for CAN, serial communication part and the like installed in the existing processing device can be utilized, thereby allowing the existing system to be utilized.

According to the present invention, each power of a plurality of processing devices connected to the same communication medium (communication line) can individually be turned off, so that the power consumption of the entire system including the processing devices can further be reduced. There is no need to provide a dedicated line for connection between the processing devices for power control. Also, an existing device may be used for the communication part.

The above and further objects and features will move fully be apparent from the following detailed description with accompanying drawings.

DETAILED DESCRIPTION OF NON-LIMITING EXAMPLE EMBODIMENTS

The present invention will now be described in detail with reference to the drawings illustrating the embodiment thereof. It is noted that, in the embodiment below, an example will be described where the present invention is applied to an in-vehicle communication system in which a plurality of ECUs mounted on a vehicle are connected to each other.

Figure 1:
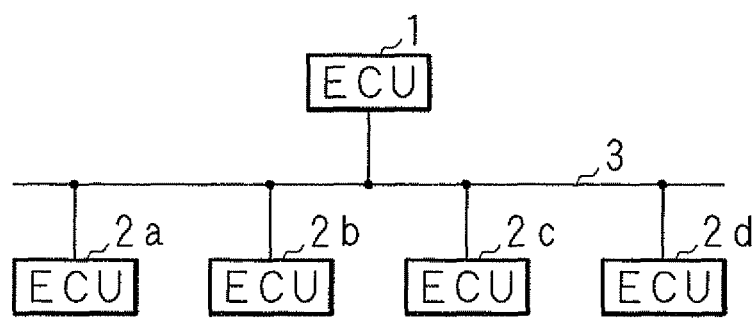
FIG. 1 is a configuration view illustrating a configuration of an in-vehicle communication system according to the present embodiment.

FIG. 1 is a configuration view illustrating a configuration of an in-vehicle communication system according to the present embodiment. The in-vehicle communication system includes ECU 1, ECU 2a, ECU 2b, ECU 2c and ECU 2d as well as a CAN bus 3.

Each of the ECU 1, ECU 2a, ECU 2b, ECU 2c and ECU 2d according to the present embodiment is a control device for executing control by a processor in accordance with a computer program, i.e. a microcomputer, for each device mounted on a vehicle for realizing various functions of the vehicle. While the ECU 1, ECU 2a, ECU 2b, ECU 2c and ECU 2d are configured to perform processing for implementing different functions, they are connected to the same CAN bus 3 and mutually transmit and receive data on the basis of a CAN protocol to perform processing.

The CAN bus 3 is a twist pair cable used in the communication according to the CAN protocol. A shielded twist pair cable is desirable to be used as the CAN bus 3. The ECU 1, ECU 2a, ECU 2b, ECU 2c and ECU 2d basically perform CAN communication using a differential signal via the CAN bus 3.

The ECU 1 includes, for example, a function of power supply control which controls power-on/off of a device mounted on a vehicle and controls an amount of power consumption for the entire system mounted on the vehicle. The ECU 1 may be connected to a battery sensor (not shown) and may have a function of monitoring a remaining amount of a battery and performing power-supply control on the basis of the remaining amount of battery. For the power supply control, the ECU 1 serves as a master for the ECU 2a, ECU 2b, ECU 2c and ECU 2d, and includes a function of individually controlling power-on/off of each of the ECU 2a, ECU 2b, ECU 2c and ECU 2c1, which serves as a slave. Note that each of the ECU 1, ECU 2a, ECU 2b, ECU 2c and ECU 2d is assigned with an ID number, while storing its own ID number.

The ECU 2a and ECU 2b operate when a vehicle is halted, especially when the ignition switch is off, whereas the ECU 2c and ECU 2d operate regardless of whether or not the vehicle is moving. For example, the ECU 2a is a device for performing processing of locking/unlocking of a door and power of ECU 2a may be turned off while the vehicle is moving. The ECU 2b is a device for security processing such as issuance of a warning by detecting, for example, forcible unlocking of a door, an impact on the vehicle body and a jack-up while the vehicle is halted, and thus power of ECU 2b may be turned off while the vehicle is moving.

As described above, though the ECU 2a, ECU 2b, ECU 2c and ECU 2d are connected to the same CAN bus 3, they have different functions and operate in different circumstances. In the present embodiment, as will be described below, the ECU 1 individually controls power-on/off in each of the ECU 2a, ECU 2b, ECU 2c and ECU 2d according to a circumstance. Note that, in the in-vehicle communication system according to the present embodiment, each of the ECU 2a, ECU 2b, ECU 2c and ECU 2d determines for itself whether or not its power may be turned off (or whether or not it may be switched to a power-saving state), and turns the power off when it may be switched to the power-off, while the ECU 1 controls to turn on the power supply in each of the ECU 2a, ECU 2b, ECU 2c, and ECU 2d when they are to be activated individually. It should be understood that the ECU 1 may also control to turn off the power supply for each of the ECU 2a, ECU 2b, ECU 2c and ECU 2d.

Figure 2:
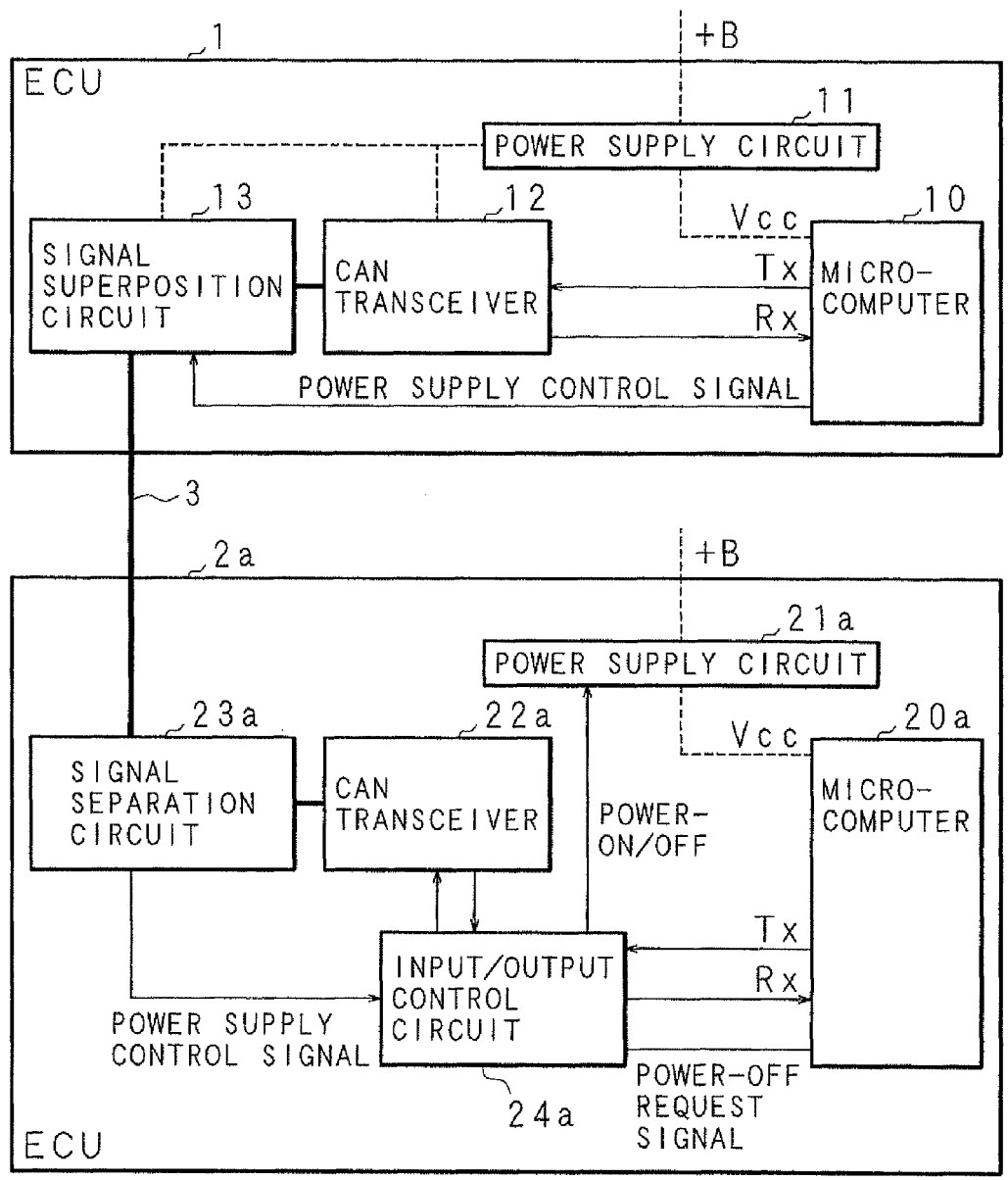
FIG. 2 is a block diagram illustrating an internal configuration of an ECU according to the present embodiment.

FIG. 2 is a block diagram illustrating an internal configuration of the ECUs 1, 2a, 2b, 2c and 2d according to the present embodiment. In the drawing, the solid lines indicate input/output of signals, the broken lines indicate power supply, and the thick lines indicate communication lines. Since the internal configuration of the ECU 2a is similar to that of the other ECUs 2b, 2c and 2d, only the internal configuration of the ECU 2a will specifically be described below whereas the internal configuration of the ECUs 2b, 2c and 2d will not be described in detail.

The ECU 1 includes a microcomputer 10, a power supply circuit 11, a CAN transceiver 12 and a signal superposition circuit 13. The microcomputer 10 receives power from a battery (+B) (not shown) which is supplied by the power supply circuit 11 through a Vcc terminal and operates. The microcomputer 10 is connected to the CAN transceiver 12 at transmission/reception terminals Tx, Rx. The microcomputer 10 is also connected to the signal superposition circuit 13 by serial communication. The CAN transceiver 12 is connected to the signal superposition circuit 13 and further to the communication line 3 via the signal superposition circuit 13.

The microcomputer 10 internally includes a CPU (Central Processing Unit), a ROM (Read Only Memory) and a RAM (Random Access Memory) (none of those are shown). In the microcomputer 10 the CPU reads out and executes a computer program pre-stored in the ROM to implement the function of the ECU 1. The microcomputer 10 has the function of a CAN communication controller and performs CAN communication by the CAN transceiver 12 connected through transmission/reception terminals Tx, Rx. The microcomputer 10 determines whether the power supply needs to be turned on or off for the ECU 2a, ECU 2b, ECU 2c and ECU 2d from the information obtained by the CAN communication on the basis of the computer program stored in the ROM. The microcomputer 10 then outputs, by serial communication, a power supply control signal indicating on or off of the power supply to any one of the ECU 2a, ECU 2b, ECU 2c and ECU 2d for which it is determined that the on/off state of the power supply needs to be changed.

The power supply circuit 11 is connected to the battery (+B), to appropriately adjust a voltage value and a current value and supply power from the battery to each of the components in the ECU 1.

The CAN transceiver 12 implements transmission and reception of differential signals based on CAN at a physical layer. The CAN transceiver 12 converts a signal applied from the transmission terminal Tx of the microcomputer 10 into a CAN signal and outputs the converted signal. The CAN transceiver 12 also receives on the basis of the CAN protocol via the signal superposition circuit 13, the signal sent out to the CAN bus 3 and inputs the received signal to the reception terminal Rx of the microcomputer 10.

Figure 3:
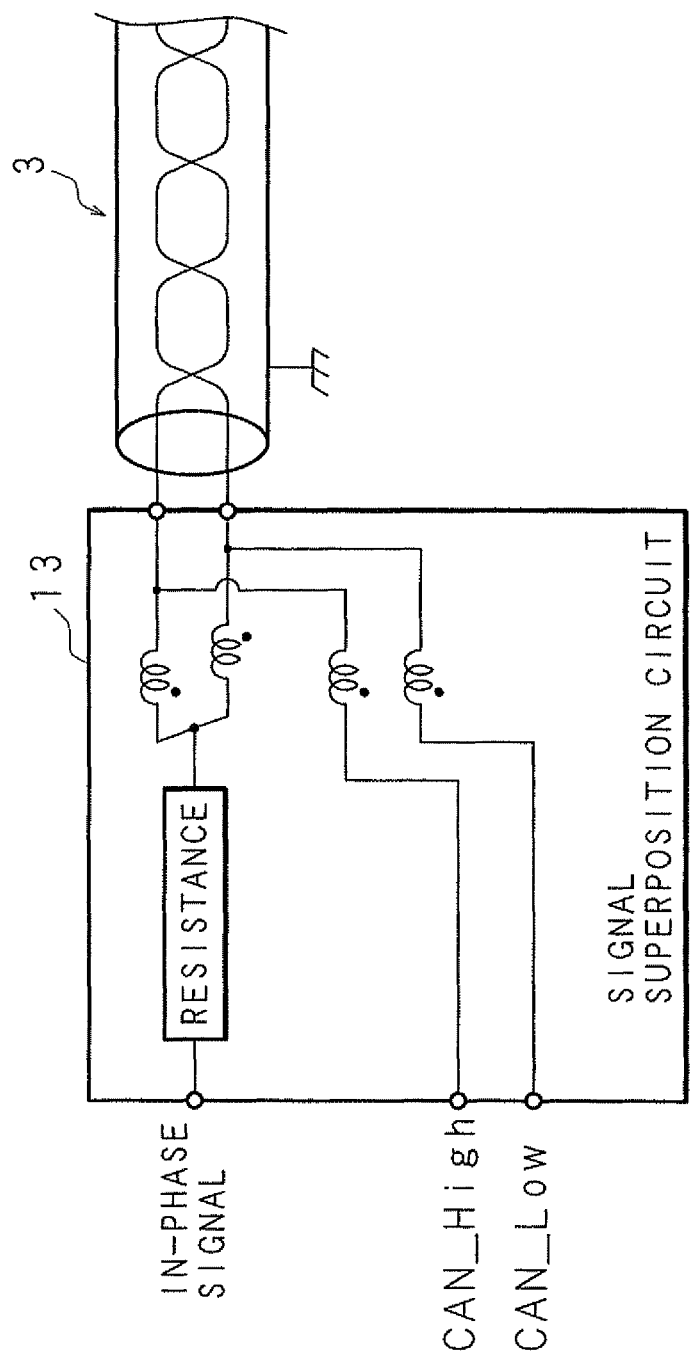
FIG. 3 is a schematic view schematically illustrating a principle of a signal superposition circuit.

The signal superposition circuit 13 sends out the transmission signal output from the CAN transceiver 12 to the pair cable of the CAN bus 3, while transmitting the power supply control signal output from the microcomputer 10 in the same phase to each one of the pair cable of the CAN bus 3 by serial communication. The signal superposition circuit 13 can simultaneously superpose the CAN communication signal and the power supply control signal, and transmit them to the CAN bus 3. It is noted that the signal superposition circuit 13 can also input the differential signal output to the CAN bus 3 to the CAN transceiver 12. The signal superposition circuit 13 specifically includes a circuit which connects inductances to each one of the pair cable of the CAN bus 3 to transmit a CAN_High signal and a CAN_Low signal respectively, and a circuit provided in parallel with the above-described circuit, connecting coupling inductances to each one of the pair cable of the CAN bus 3 to allow transmission of in-phase signals respectively. FIG. 3 is a schematic view schematically illustrating the principle of the signal superposition circuit 13. As shown in FIG. 3, the signal superposition circuit 13 is realized by a circuit which connects the coupling inductances to each of the terminals connected to each one of the pair cable and connects a resistance for matching a signal to the coupling terminals of the coupling inductances so as to input/output an in-phase signal on the resistance side, and by a circuit which is connected in parallel with the above-described circuit and inputs the CAN_High signal and the CAN_Low signal through the inductances respectively to the terminals connected to each one of the pair cable. This allows the signal superposition circuit 13 to send out the CAN transmission signal output from the CAN transceiver 12 to the CAN bus 3 and also to send out the power supply control signal which is a serial communication signal applied from the microcomputer 10 to the CAN bus 3 as in-phase signals.

Figure 4:
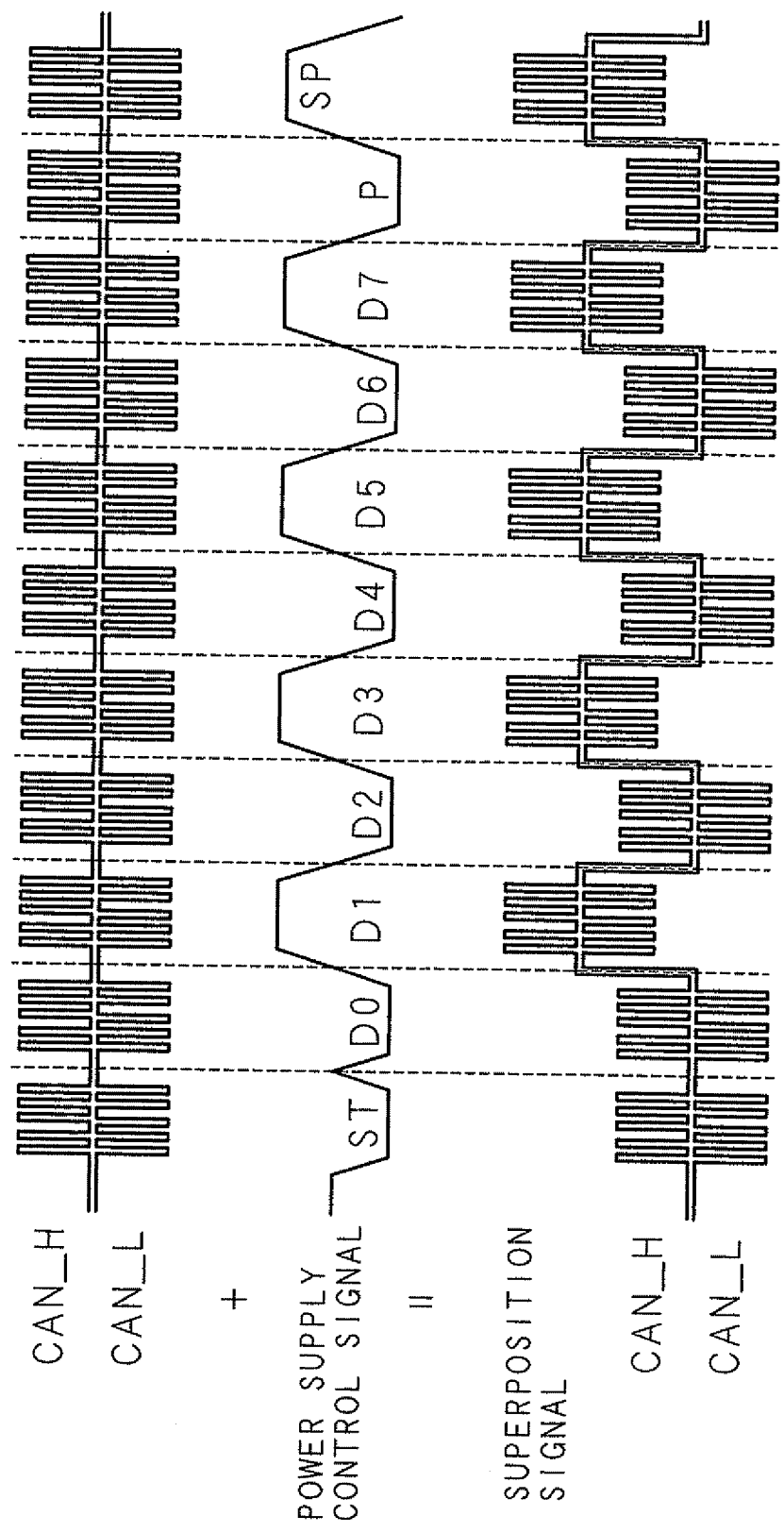
FIG. 4 is a waveform illustrating a superposition signal implemented by the signal superposition circuit.

FIG. 4 is a waveform illustrating a superposition signal implemented by the signal superposition circuit 13. Shown from the top of FIG. 4 are: the CAN_High signal (indicated as CAN_H in FIG. 4) and CAN_Low signal (indicated as CAN_L in FIG. 4) that are output from the CAN transceiver 12; the power supply control signal which is a serial signal directly output from the microcomputer 10; and the superposition signal sent out to each one of the pair cable of the CAN bus 3 as a result of superposition.

As shown in FIG. 4, the serial signal is lower in the communication speed compared to the CAN signal. The information included in several bits of the CAN signal corresponds to one bit of the power supply control signal. The power supply control signal which will be described below includes data bits corresponding to eight bits (D0-D7) between a start bit (ST), a parity bit (P) and a stop bit (SP) in the serial communication. The eight bits are used to identify IDs for the ECU 2a, ECU 2b, ECU 2c and ECU 2d to be controlled. The power supply control signal is interpreted as a signal for instructing to turn the power on (power off is determined by each of the ECUs 2a to 2d). For example, each ID of the slave ECU 2a, ECU 2b, ECU 2c or ECU 2d is represented by data bits corresponding to eight bits, for example "00010000" (Number 16). It is understood that the power supply control signal may have a meaning of any one of power-on or power-off. It may be arranged that the first seven bits (D0-D6) in the data bits represent an ID for the slave ECU 2a, ECU 2b, ECU 2c or ECU 2d, while the eighth bit (D7) represents the power-on as "1" or power-off as "0." Moreover, the eight bits may represent power-on/off for all the ECUs 2a, 2b, 2c and 2d. It may be configured, for example, that the first bit (D0) corresponds to the ECU 2a, the second bit (D1) corresponds to the ECU 2b, the third bit (D2) corresponds to the ECU 2c, and the fourth bit (D3) corresponds to the ECU 2d, and the power is on if a bit is "1" whereas the power is off if a bit is "0." In such a case, on the basis of one condition, it is possible to control power-on/off for each of the ECUs 2a, 2b, 2c and 2d by one transmission of power supply control signal.

The ECU 1 configured as described above determines which one of the ECU 2a, ECU 2b, ECU 2c and ECU 2d is to be turned on from the power-off state by the processing of the CPU in the microcomputer 10, and transmits a power supply control signal to the CAN bus 3 by the signal superposition circuit 13. For example, ECU 2a and ECU 2b respectively determines that power of the ECU 2a and the ECU 2b can be turned off after the vehicle starts moving and the speed is increased to 20 km/h or higher, and the ECU 2a and the ECU 2b respectively turn off the power for themselves. Thereafter, even when the vehicle is moving, in a case where the ECU 1 senses the request for unlocking a door on the basis of an input from a switch at a driver's seat or the like, the ECU 1 transmits a power supply control signal for instructing to turn on the power so as to turn on the ECU 2a. The power supply control signal includes node IDs for distinguishing the slave ECUs 2a, 2b, 2c and 2d from one another. The power supply control signal enables each of the ECU 2a, ECU 2b, ECU 2c and ECU 2d to determine whether or not the power supply control signal is directed to itself.

The ECU 2a includes a microcomputer 20a, a power supply circuit 21a, a CAN transceiver 22a, a signal separation circuit 23a and an input/output control circuit 24a. The microcomputer 20a is connected to the power supply circuit 21a through a Vcc terminal, and is further connected to the input/output control circuit 24a at transmission/reception terminals Tx, Rx and an input/output terminal. The power supply circuit 21a is connected not only to the microcomputer 20a but also to the CAN transceiver 22a, the signal separation circuit 23a and the input/output control circuit 24a through an electric power line (not shown). The input/output control circuit 24a is connected to the CAN transceiver 22a so as to be able to input and output a transmission signal and a reception signal, and is also connected to the signal separation circuit 23a by serial communication and further to the power supply circuit 21a so as to be able to input and output power-on/off signals. The signal separation circuit 23a is not only connected directly to the input/output control circuit 24 by serial communication but also connected to the CAN transceiver 22a.

The microcomputer 20a internally includes a CPU, a ROM and a RAM, and realizes the processing of locking/unlocking of a door by the CPU reading out and executing a computer program pre-stored in the ROM. The microcomputer 20a includes a Vcc terminal for receiving power supply, a transmission/reception terminal for communication and an input/output terminal. The microcomputer 20a accepts, at the reception terminal Rx, a CAN reception signal input via the input/output control circuit 24a, obtains information by CAN communication, and outputs the information transmitted by CAN communication from the transmission terminal Tx. Generally, the microcomputer 20a is activated in a case where microcomputer 20a senses the input of a reception signal at the reception terminal Rx even when the microcomputer 20a is in a power-saving state (sleep state). When the microcomputer 20a determines that it is switched to the power-off state, the microcomputer 20a outputs a power-off request signal from the output terminal to the input/output control circuit 24a. For example, the microcomputer 20a determines for itself that it is to be switched to the power-off state when the microcomputer 20a senses on the basis of information on the ignition switch and the travelling speed obtained by CAN communication, that the ignition switch is turned on and the travelling speed reached 20 km/h or higher.

The power supply circuit 21a is connected to the battery (+B), and appropriately adjusts a voltage value as well as a current value with respect to each of the components in the ECU 2a, to supply power from the battery. Note that the power supply circuit 21a has a function of switching on/off of the power supply to the microcomputer 20a on the basis of the power-on/off signals input from the input/output control circuit 24a. When a power off signal is input to the power supply circuit 21a from the input/output control circuit 24a, the power supply circuit 21a stops power supply to the microcomputer 20a on the basis of the power-off signal, whereas the power supply circuit 21a starts the power supply when a power-on signal is input to the power supply circuit 21a.

The CAN transceiver 22a implements transmission and reception of a differential signal based on CAN at a physical layer. The CAN transceiver 22a converts into a CAN signal, a signal applied from the transmission terminal Tx of the microcomputer 20a and input via the input/output control circuit 24a and outputs the converted signal. The CAN transceiver 22a receives according to the CAN protocol via the signal separation circuit 23a, a signal sent out to the CAN bus 3, and inputs the received signal to the reception terminal Rx of the microcomputer 20a via the input/output control circuit 24a.

The signal separation circuit 23a inputs a differential signal output onto the CAN bus 3 to the CAN transceiver 22a, while inputting the in-phase signal output onto the CAN bus 3 to the input/output control circuit 24a. The signal separation circuit 23a can receive both the differential signal and the in-phase signal simultaneously generated on the CAN bus 3 and can separate the superposition signal into the differential signal and the in-phase signal. In other words, the signal separation circuit 23a can separate the superposition signal shown in FIG. 4 into a CAN communication signal and a power supply control signal shown at the upper part of FIG. 4, and can input them to the CAN transceiver 22a and the input/output control circuit 24a, respectively. The signal separation circuit 23a further has a function of outputting the transmission signal, transmitted from the transmission terminal Tx of the microcomputer 20a and sent through the input/output control circuit 24a, as a differential signal according to the CAN protocol. The specific configuration of the signal separation circuit 23a includes, as in the signal superposition circuit 13 shown in FIG. 3, coupling inductances connected respectively at the connecting parts of the CAN transceiver 22a and the CAN bus 3 and coupling inductances are connected in parallel. This allows the CAN transceiver 22a to be input the CAN_High signal and the CAN_Low signal and the input/output control circuit 24a to receive a serial communication signal generated in the same phase at the superposed CAN_High and CAN_Low. Note that the signal separation circuit 23a may be provided with one stage of a differential amplifier.

The input/output control circuit 24a interprets the serial communication signal received at the signal separation circuit 23a as a power supply control signal, and inputs a power-on/off signal to the power supply circuit 21a on the basis of the received power supply control signal in a case where the received power supply control signal is directed to the ECU 2a. Moreover, the input/output control circuit 24a cuts off the input and output of the CAN transmission signal between the CAN transceiver 22a and the microcomputer 20a when the input/output control circuit 24a receives the power supply control signal directed to the ECU 2a and the received power supply control signal is a signal for instructing to turn off the power. As for the cut-off, the connection between the CAN transceiver 22a and the microcomputer 20a may physically be cut off, or power of the microcomputer 20a may be turned off so as to logically prevent the microcomputer 20a from accepting a CAN communication signal. Furthermore, a reception signal input from the CAN transceiver 22a may logically be cut off so as not to be input to the reception terminal Rx of the microcomputer 20a. When, on the contrary, the received power supply control signal directed to the ECU 2a is a signal for instructing to turn on the power, the input/output control circuit 24a inputs a power-on signal to the power supply circuit 21a, while cancelling the cutting-off of communication between the CAN transceiver 22a and the microcomputer 20a to recover such that communication is possible.

In the ECU 2a configured as described above, microcomputer 20a determines whether or not it is to be switched to the power-off state, and when it is to be switched, the microcomputer 20a outputs a power-off request signal to the input/output control circuit 24a to stop power supply. In such a case, when the power is off, the ECU 2a ignores any CAN communication signal transmitted onto the CAN bus 3 and will not be in the operating state. This is because the input/output control circuit 24a cuts off input and output of the CAN communication signal. It is noted that, without the input/output control circuit 24a, the microcomputer 20a is not activated even when the CAN reception signal is input to the microcomputer 20a in the state where the microcomputer 20a is not supplied with power. This allows, in a case where the vehicle is moving, the ECUs 2a and 2b to maintain the power-off state even when the other ECUs 2c and 2d connected to the CAN bus 3 are activated, thereby reducing the amount of power consumption in the entire in-vehicle communication system.

Figure 5:
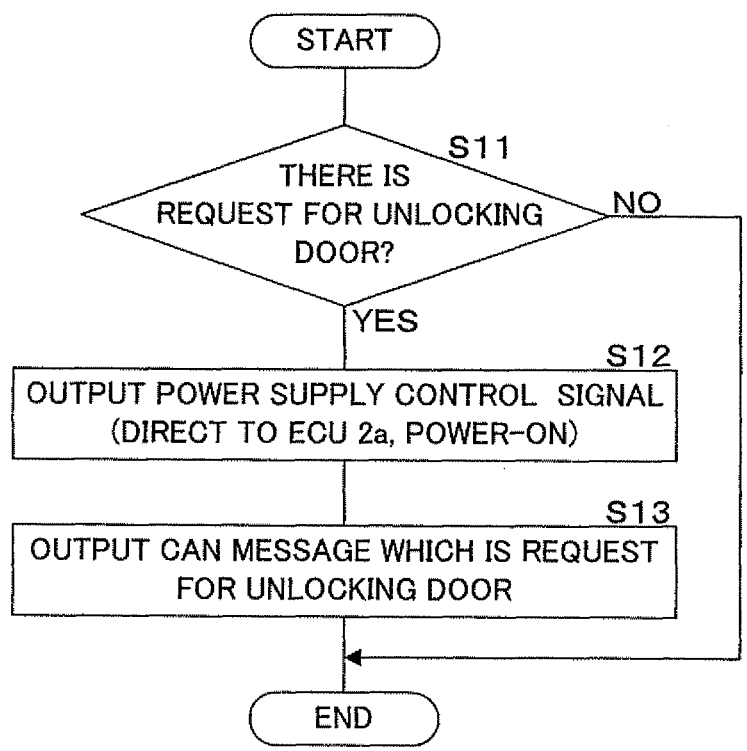
FIG. 5 is a flowchart illustrating an example of the processing procedure in an ECU of a master according to the present embodiment.

FIG. 5 is a flowchart illustrating an example of the processing procedure in the ECU 1 of a master according to the present embodiment. The example illustrated in the flowchart of FIG. 5 describes a processing procedure performed when requesting the ECU 2a which is already in the power-off state to unlock a door. Note that the microcomputer 10 in the ECU 1 can sense the power-off state of the ECU 2a on the basis of the circumstance in that the CAN communication is not performed with the ECU 2a.

The microcomputer 10 determines whether or not there is a request for unlocking a door on the basis of a CAN message received at the CAN transceiver 12 and obtained at the reception terminal Rx (step S11). For example, when the driver turns on a switch for unlocking a door in a driver's seat while the driver is operating a moving car, an ECU to which information from the switch is input transmits a CAN message including a request for unlocking a door to the CAN bus 3. Here, the ECU 2a is already in the power-off state, so that it cannot receive the CAN message.

When the microcomputer 10 determines that there is no request for unlocking a door (S11: NO), the microcomputer 10 terminates the processing. Note that the microcomputer 10 regularly repeats the processing of FIG. 5. Thus, the microcomputer 10 starts the processing again from the step S11.

When the microcomputer 10 determines that there is a request for unlocking a door (S11: YES), the microcomputer 10 outputs a power supply control signal which instructs to turn on power of the ECU 2a from an output terminal through serial communication (step S12). The power supply control signal output from the microcomputer 10 is transmitted to the CAN bus 3 through the signal superposition circuit 13. Subsequently, the microcomputer 10 outputs a CAN message which is a request for unlocking a door from the transmission terminal Tx (step S13), and terminates the processing. The CAN message output from the transmission terminal Tx of the microcomputer 10 is transmitted to the CAN bus 3 by the CAN transceiver 12 via the signal superposition circuit 13. After the processing at step S13, the microcomputer 10 may confirm whether or not a door is unlocked on the basis of the information obtained through CAN communication, and output the power supply control signal and CAN message several times until the door is unlocked.

Not limited to the processing procedure illustrated in the flowchart of FIG. 5, the microcomputer 10 may determine whether or not it is required to be turned off from the power-on state or to be turned on from the power-off state for each of the ECU 2a, ECU 2b, ECU 2c and ECU 2d (S11), and when the microcomputer 10 determines as "required" (S11: YES), the microcomputer 10 may perform the processing of outputting a power supply control signal indicating the power-off or power-on (S12). Though in the flowchart of FIG. 5, the microcomputer 10 executes the step of transmitting the request for unlocking a door through CAN communication (S13) because the microcomputer 10 determines that there is a request for unlocking a door for the basis of determination that the power needs to be turned on at step S11, the step of transmitting the CAN message through CAN communication is not essential.

Figure 6:
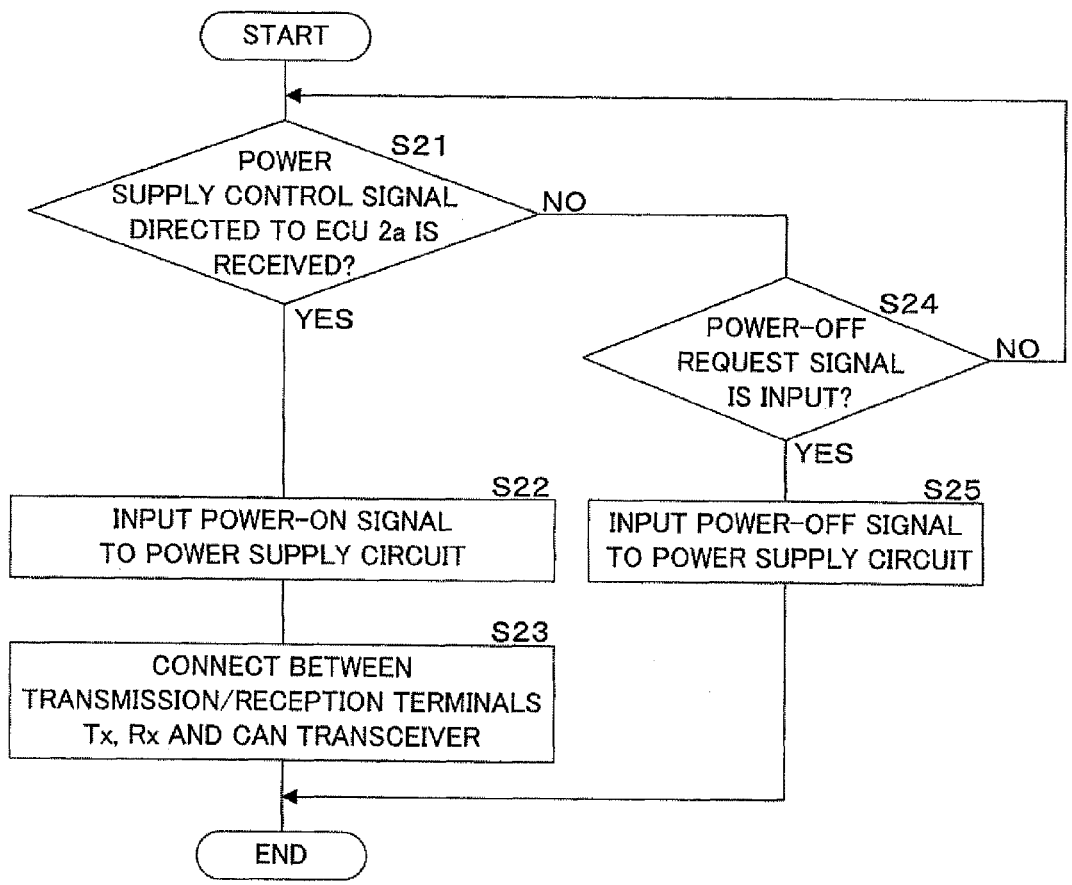
FIG. 6 is a flowchart illustrating an example of the processing procedure in an input/output control circuit of an ECU according to the present embodiment.

FIG. 6 is a flowchart illustrating an example of a processing procedure in the input/output control circuit 24a of the ECU 2a according to the present embodiment. The processing procedure in the ECU 2a is similar to the processing procedure in the other slaves of ECUs 2b, 2c and 2d. Therefore, the processing procedure in the ECU 2a will hereinafter be described in detail, while the processing procedure in the other ECUs 2b, 2c and 2d will not be described in detail.

The input/output control circuit 24a in the ECU 2a determines whether or not a power supply control signal directed to itself (ECU 2a) is received from the signal separation circuit 23a (step S21).

When the input/output control circuit 24a determines that the input/output control circuit 24a receives the power supply control signal directed to the ECU 2a (S21: YES), the input/output control circuit 24a inputs a power-on signal to the power supply circuit 21a (step S22) since the power supply control signal is a signal for instructing to turn on the power in the present embodiment, cancels cutting-off (connects) between the transmission/reception terminals Tx, Rx of the microcomputer 20a and the CAN transceiver 22a (step S23), and terminates the processing.

When the input/output control circuit 24a determines that the input/output control circuit 24a has not received the power supply control signal directed to the ECU 2a (S21: NO), the input/output control circuit 24a determines whether or not a power-off request signal is input from the microcomputer 20a (step S24). When the input/output control circuit 24a determines that a power-off request signal is input (S24: YES), the input/output control circuit 24a inputs a power-off signal to the power supply circuit 21a (step S25), and terminates the processing. Here, the microcomputer 20a is turned off, so that the communication between the CAN transceiver 22a and the microcomputer 20a is cut off. Here, the input/output control circuit 24a may intentionally cut off the physical connection between the microcomputer 20a and the CAN transceiver 22a after the input/output control circuit 24a outputs the power-off signal to the power supply circuit 21a at step S25.

When the input/output control circuit 24a determines that power-off request signal is not input (S24: NO), the input/output control circuit 24a returns the processing to step S21.

In a case where the power supply control signal has both meanings of power-on and power-off, the input/output control circuit 24a determines, after step S21, whether or not the received power supply control signal is the one indicating power-on. When the input/output control circuit 24a determines that the received power supply control signal is the one indicating power-on, the input/output control circuit 24a performs processing at steps S22 and S23. When, on the contrary, the input/output control circuit 24a determines that the received power supply control signal is the one indicating the power-off, the input/output control circuit 24a performs the processing at step S25. Here also, the input/output control circuit 24a may cut off the physical connection between the microcomputer 20a and the CAN transceiver 22a.

Figure 7:
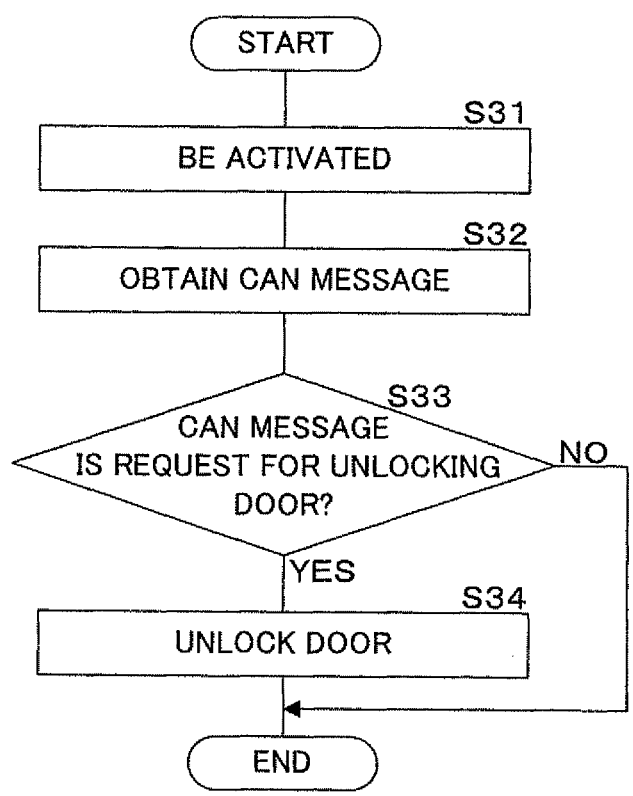
FIG. 7 is a flowchart illustrating an example of the processing procedure performed when power of a microcomputer in an ECU is turned on in the present embodiment.

FIG. 7 is a flowchart illustrating an example of the processing procedure performed when power of the microcomputer 20a in the ECU 2a is turned on in the present embodiment.

The microcomputer 20a is activated when the power supply circuit 21a accepts an input of a power-on signal to start power supply (step S31), and obtains the CAN message transmitted by the transmission/reception terminals Tx, Rx through CAN communication (step S32). The microcomputer 20a determines whether or not the obtained CAN message is a request for unlocking a door (step S33), and when the microcomputer 20a determines as the request for unlocking (S33: YES), the microcomputer 20a performs processing of unlocking a door (step S34), and terminates the processing. When the microcomputer 20a determines that the message is not the request for unlocking at step S33 (S33: NO), the microcomputer 20a terminates the processing without any further procedure.

As described above, the ECU 1 that is a master and the ECU 2a, ECU 2b, ECU 2c and ECU 2d that are slaves transmit and receive power supply control signals so as to be able to superpose the power supply control signal with the CAN communication. Thus, power of the slave ECUs 2a, 2b, 2c and 2d can be turned on (or turned off) individually and an amount of power consumption in the entire in-vehicle communication system can be reduced.

It should be recognized that the disclosed embodiment is illustrative and not restrictive in all aspects. The scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A processing system comprising:
a plurality of processing devices connected via a communication line, each of the processing devices including:
   a processing part processing an input signal and outputting the processed signal,
   a communication part connected to a communication line including two signal lines, the communication part: (i) receiving a signal transmitted using a differential signal on the basis of a first communication system to the communication line, (ii) outputting the received signal to the processing part, and (iii) transmitting on the basis of the first communication system, the signal output from the processing part to the communication line; and
   a power supply control part controlling supply/non-supply of power from outside of the processing system to the processing part,
wherein the processing part of one processing device among the plurality of processing devices outputs a control signal for controlling supply/non-supply of the power to the processing part of another processing device,
wherein the one processing device further includes:
   a transmission part transmitting on the basis of a second communication system, the control signal output by the processing part of the one processing device to signal lines of the communication line in a same phase,
wherein the another processing device further includes:
   a reception part receiving a first signal based on the first communication system and a second signal based on the second communication system from the communication line,
wherein in the another processing device the first signal received by the reception part is input to the communication part,
wherein the power supply control part of the another processing device controls supply/non-supply of the power on the basis of the second signal received by the reception part.

2. The processing system according to claim 1,
wherein the another processing device further includes:
   a determination part determining whether or not the second signal received by the reception part is a control signal indicating non-supply of the power; and
   a cutoff part cutting off communication between the communication part and the processing part of the another processing device in a case where the determination part determines that the second signal is the control signal indicating non-supply.

3. The processing system according to claim 2,
wherein the power supply control part of the another processing device supplies the power in a case where the determination part determines that the second signal is a control signal indicating supply,
wherein the another processing device further includes:
a cancellation part canceling cutting-off of communication between the communication part and the processing part in a case where the determination part determines that the second signal is a control signal indicating supply.

4. The processing system according to claim 2,
wherein the second signal includes destination information for identifying a processing device to be controlled for power-on/off,
wherein the another processing device further includes:
a second determination part determining whether or not the second signal received by the reception part is directed to the another processing device,
wherein the another processing device ignores the second signal received by the reception part in a case where the second determination part determines as not.

5. The processing system according to claim 2,
wherein the second signal includes information indicating power-on/off for each of a plurality of other processing devices.

6. The processing system according to claim 1,
wherein a communication speed in the second communication system is lower than a communication speed in the first communication system.

7. The processing system according to claim 1,
wherein in the second communication system serial communication is executed.

8. A processing device, comprising:
a processing part processing an input signal and outputting the processed signal;
a communication part connected to a communication line including two signal lines, receiving a signal transmitted using a differential signal on the basis of a first communication system to the communication line, outputting the received signal to the processing part, and transmitting on the basis of the first communication system, the signal output from the processing part to the communication line,
wherein the processing part outputs a control signal for controlling supply/non-supply of power in another processing device,
the processing device further comprising:
a transmission part transmitting on the basis of a second communication system, the control signal output by the processing part to signal lines of the communication line in a same phase.

9. A processing device, comprising:
a processing part processing an input signal and outputting the processed signal,
a communication part connected to a communication line including two signal lines, receiving a signal transmitted using a differential signal on the basis of a first communication system to the communication line, outputting the received signal to the processing part, and transmitting on the basis of the first communication system, the signal output from the processing part to the communication line;
a power supply control part controlling supply/non-supply of power from outside of the processing system to the processing part; and
a reception part receiving a first signal based on the first communication system and a second signal based on the second communication system from the communication line,
wherein the first signal received by the reception part is input to the communication part,
wherein the power supply control part controls supply/non-supply of the power on the basis of the second signal received by the reception part.

10. A power supply control method for controlling power consumption of a processing system including a plurality of processing devices connected via a communication line including two signal lines, each of the processing devices including a processing part processing an input signal and outputting the processed signal, receiving a signal transmitted using a differential signal on the basis of a first communication system to the communication line, outputting the received signal to the processing part, transmitting on the basis of the first communication system, the signal output from the processing part to the communication line, and controlling supply/non-supply of power from outside the processing system to the processing part, the method for one processing device among the plurality of processing devices comprising a step of:
transmitting on the basis of a second communication system, a control signal for controlling supply/non-supply of the power to the processing part of another processing device, to signal lines of the communication line in a same phase,
wherein the another processing device comprising steps of:
receiving a first signal based on the first communication system and a second signal based on the second communication system from the communication line; and
controlling supply/non-supply of the power to the processing part of the another processing device on the basis of the received second signal.

* * * * *